United States Patent
Gehrer

Patent Number: 5,725,342
Date of Patent: Mar. 10, 1998

[54] SPREADER DOWEL

[75] Inventor: Wilfried Gehrer, Hoechst, Austria

[73] Assignee: Grass AG, Austria

[21] Appl. No.: 623,541

[22] Filed: Mar. 29, 1996

[30] Foreign Application Priority Data

Mar. 30, 1995 [DE] Germany ............ 195 11 446.9

[51] Int. Cl.$^6$ ................................. F16B 31/02
[52] U.S. Cl. ................................. 411/33; 411/15
[58] Field of Search ................. 411/33, 15, 32

[56] References Cited

U.S. PATENT DOCUMENTS

| 4,862,556 | 9/1989 | Grass | 411/42 |
| 5,246,322 | 9/1993 | Salice | 411/15 |
| 5,536,122 | 7/1996 | Weber | 411/33 |

FOREIGN PATENT DOCUMENTS

| 8717482 | 1/1989 | Germany. |
| 9307086 | 8/1993 | Germany. |

Primary Examiner—Steven N. Meyers
Assistant Examiner—Tuyet-Phuong Pham
Attorney, Agent, or Firm—Kilpatrick Stockton LLP; John M. Harrington

[57] ABSTRACT

Spreading dowel, consisting of a dowel component (15) and a non circular spreader screw (1); whereby, the inner notch (17) of the dowel component (15) is fitted in its form for the outer contour of the spreader screw (1); whereby, the spreader screw (1) has one or more thread convolutions (9). By means of these thread convolutions (9), twisting the spreader screw (1) achieves the spreading expansion of the dowel component (15) together with an axial shifting of the spreader screw (1).

1 Claim, 3 Drawing Sheets

SPREADER DOWEL

BACKGROUND AND FIELD OF THE INVENTION

The object of the invention is a spreader dowel with a spreader screw. Such a system was previously made known with an application by the same applicant. A system of that type consists of a spreader screw, which has a fundamentally non circular or oval shape, is placed in a central notch in a dowel component. The corresponding notch in the dowel cup is likewise formed so that it basically fits the shape of the spreader screw. Consequently, this notch is likewise shaped non circular. So if the spread screw is placed in one of its twisting positions in the non circular bore hole in the dowel cup, there is no spreading because the areas with a larger radial diameter lie in the notch in the dowel cup.

But if the spreader screw is twisted against it, then the surfaces of the spreader screw reach with the larger radial diameter into the other adjacent area in the notch in the dowel component which has a smaller diameter and is, as a result, spread radially outward by the spreader screw.

This type of system attains a good spreader expansion with a slight twisting of the spreader screw. The disadvantage, however, was that the spreader screw itself was not positioned securely and fixed against axial shifting in the notch in the dowel cup.

Another disadvantage is that additional tightening of the fastener element with the assistance of a spreader screw of this type had not been known until now.

So, this invention is based on the task of improving a spreader dowel of the aforementioned known type so that with the smallest possible twist of the dowel screw, the largest possible spreader expansion is guaranteed with the simultaneous tightening of the same with the spreader screw of the connected fastening element.

SUMMARY OF THE INVENTION

A fundamental feature of the invention is that the spreader component of the spreader screw has thread convolutions. It is preferred that these corresponding inner thread convolutions are located in the inner notch of the dowel component.

From the presented technical statements, it follows, therefore, that the basic advantage is that when the spreader screw is twisted, an axial movement of the spreader screw simultaneously follows in the direction of the dowel cup.

With this, the fundamental advantage has been attained; a spreader screw of this type can now be utilized to fasten and tighten corresponding fastening elements on the dowel component. Therefore, this is a classic mounting device which makes it possible for the first time to fasten any fastening elements desired on a fastening area with the use of the invention related dowel component and the spreader screw located on it.

This was not possible with the previous application made by the same applicant because, there, only a dowel component could be fastened in a cabinet/furniture element; whereby, this dowel component is fastened in a one piece material construction to a corresponding mounting plate.

The presented invention has the advantage that with the slightest possible twist (of, for example, 90 degrees), an optimal spreading action occurs, and this with plastic dowels (that can be produced cost effectively) that can be utilized as dowel components. The spreader screw is made, preferably, from metal elements or sheet metal elements.

The presented invention is not limited to the spreader screw being turned about 90 degrees. It can also be twisted at less than a 90 degree angle or for more than 90 degrees (up to, for example, 120 degrees).

What is important is that the spreader screw (in its known way) is next placed in a neutral inoperative location in the center notch in the dowel component, which has been, for example, hit or pressed in. Then the surfaces of the spreader screw with its small radial diameter lie on the corresponding inner surfaces of the center notch, which form the small inner diameter.

In this assembled position, the head of the spreader screw grips through by means of a corresponding notch in a fastening element.

Then the head of the spreader screw is twisted with a suitable tool, and the spreader cams, which are arranged in the spreader—and thread sections of the spreader screw, move in the areas of the center notch of the dowel component which have a small radial distance to the middle point and bury themselves there in the manner of the thread convolutions in the inner perimeter of this dowel component.

Hereby, it is essential that the spreader—and thread sections of the spreader screw form outwardly slanted pointed diagonal spreader flanks, which together with the thread convolutions of the corresponding inner thread areas, operate (by burying themselves) in the area of the center notch of the dowel component. Thus, the outward pointing slanted diagonal spreader flanks achieve an even better spreader action, which was basically attained by means of the flank angles of the thread convolutions.

So, the spreader—and thread sections of the spreader screw bury or entrench themselves in the center notch of the dowel section and, simultaneously, spread outwardly.

So, three different motion processes take place. Namely, once the axial movement of the spreader screw begins in the direction of the bottom section of the dowel component, the tightening of the fastening section to the dowel section is guaranteed. Furthermore, the thread convolutions spread out when they bury in the inner perimeter of the dowel component, and the spreading action is further improved by the outwardly pointing slanted spreader flanks.

It is preferred that the presented invention has a foot base on the lower end of the spreader screw. This foot base has an outwardly pointing slanted wedge areas which, on the upper sides, define a circumferential rotating shoulder.

With this circumferential shoulder, the spreading screw reaches a corresponding notch in the dowel component following the resulting spreading and fixing in the dowel component, and is secured there, preventing it from being extracted.

So, this also concerns the securing of the position of the spreading screw when it expands with its spreader action in the dowel component.

The invention related objectives of the submitted invention result from not only the matter of the particulars of the protection claims, but also the various combinations of the individual protection claims.

All records, documents and evidence, inclusive of the abstract, open and disclosed statements and declarations and indications and features, especially those represented embodiments in the drawings, will be claimed as fundamental and significant inventions, as far as the claims individually or in combinations are relative to the position that the technology is new.

The innovation at hand will be explained more precisely by the various embodiments shown by the representational drawings. Hereby, additional significant features and advantages of the innovation will be concluded from the designs and their descriptions.

DESCRIPTION OF THE PREFERRED EMBODIMENT

According to FIGS. 1–4, the spreader screw (1) has a head (2) which has a cross recession (3). Other cut away recessions, such as the cross hole, for tools can also be incorporated (such as a slot, a hexagon socket, or something similar).

The spreader screw has dog point projections (4, 5) placed about 180 degrees to each other on the head (2). These dog points project somewhat radially outwardly. On the bottom side of the head (2) are fastened decreasing diameters of a shank fasten.

Figure 4:
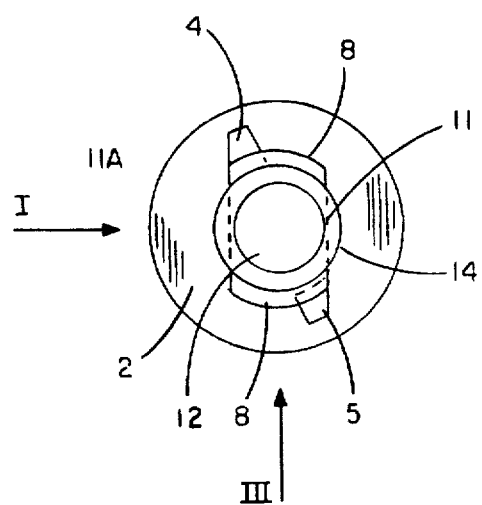
FIG. 4: is a bottom view of the spreader screw.

So, this shank fastens to the invention-related spreading- and thread sections (7), which, according to FIG. 4, consists of spreader cams (8), which shape a continuous right-handed or left-handed thread in the form of thread convolutions (9).

The thread is formed preferably with a steep incline, in order to attain the best possible spreading action and retention result from the spreader screw with only a slight twist.

Furthermore, it is important that the spreader cams (8) are defined by upwardly and outwardly radial projecting and skewed spreader flanks (10). These spreader flanks (10) achieve even more spreader action with the twisting of the spreader screw (1).

The spreader—and thread section (7) is, according to FIG. 4, placed on opposite areas of the spreader screw (1) to each other; whereby, the adjacent areas are made of relatively smoothly formed shank components (11, 11a) with decreasing diameters.

Figure 1:
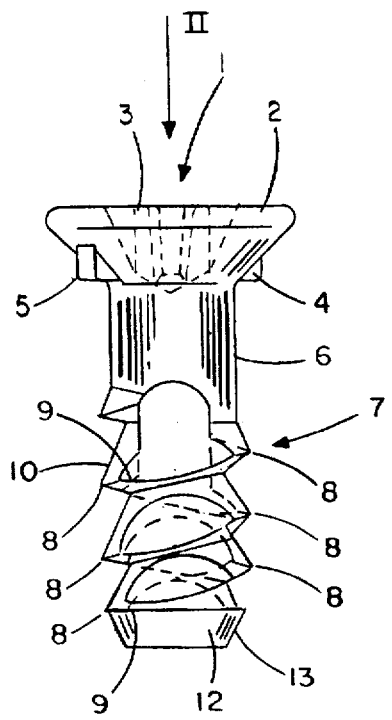
FIG. 1: is a side view of the spreader screw.
Figure 3:
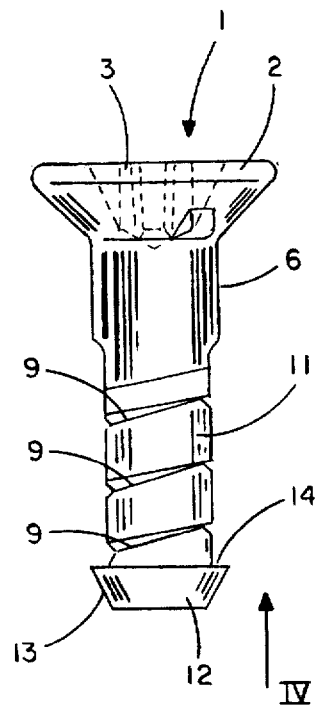
FIG. 3: is a side of the spreader screw turned approximately 90 degrees.
Figure 2:
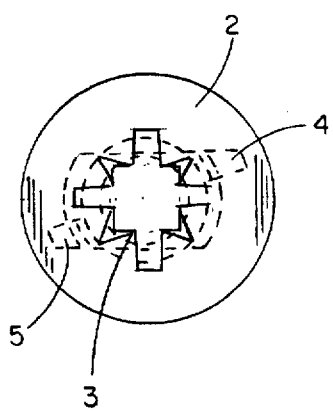
FIG. 2: is a top view of the spreader screw.

It is made known in FIG. 3 that the shank components (11, 11a), indeed, still have the thread convolutions (9), which extend in the spreader—and thread components (7), but that these thread convolutions (9) have no "spreading" function in the area of this shank component (11, 11a).

At the foot base (12) of the spreader screw (1), outwardly directed slanted wedge areas (13) are shaped which form a continuous shoulder (14).

Figure 5:
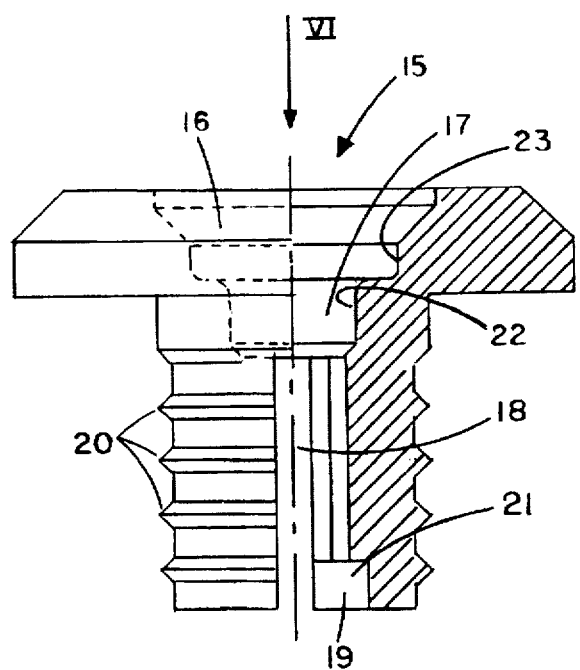
FIG. 5: is a side view with a partial section through a dowel component.
Figure 6:
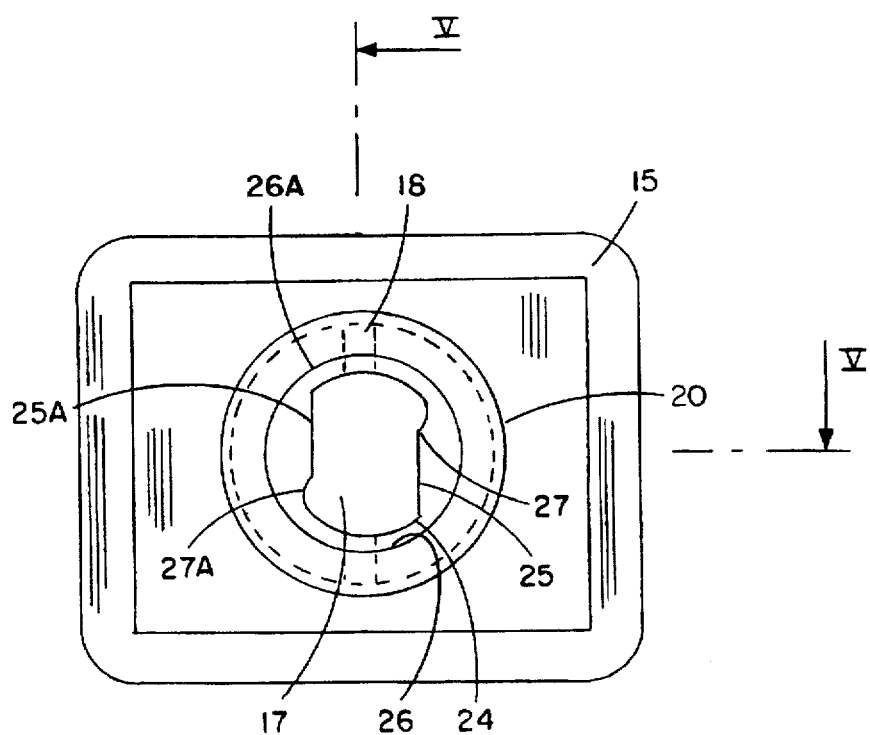
FIG. 6: is a top view according to VI in FIG. 5.

FIGS. 5 and 6 show the associated dowel component (15) which is made preferably of a plastic element. It has, hereby, an upper, central countersunk bore hole (16) with a relatively large diameter and several adjacent bore hole portions with smaller diameters, whose free positions (22, 23) form for the fastening element (30) (see FIGS. 7, 8), which partially projects in the center notch of the dowel component.

The dowel component (15) has in its lower area two oppositely placed longitudinal slots (18); whereby, only one longitudinal slot or more than two longitudinal slots can be provided.

Figure 7:
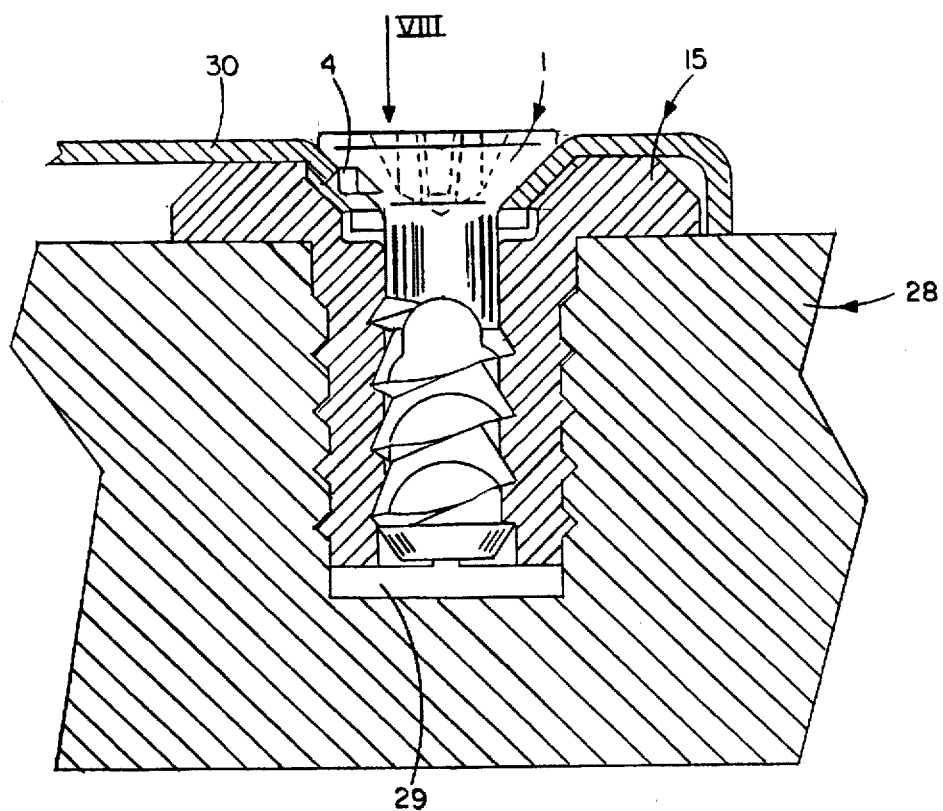
FIG. 7: is a dowel's lay-out in the operational position in the "spread out" state.

The outer perimeter has ribs (20) which are designed to bury and/or fix themselves in a corresponding cabinet/furniture component (28) (compare to FIG. 7).

The center notch (17) opens upwardly in a somewhat key hole shaped notch, which consists of elements arranged mirror symmetrical to each other. The key hole shaped edge (24) has adjacent diametrical opposing straights (25, 25a) to which each radius (26, 26a) connects. The radius (26,26a) turns on the one side into slanted inwardly pointing straights (27,27a) into the corresponding straights (25, 25a).

The foot base section of the dowel component (15) is provided with a notch (19), which forms an upper stop edge (21) to work together with the shoulder (14) of the spreader screw (1).

Figure 8:
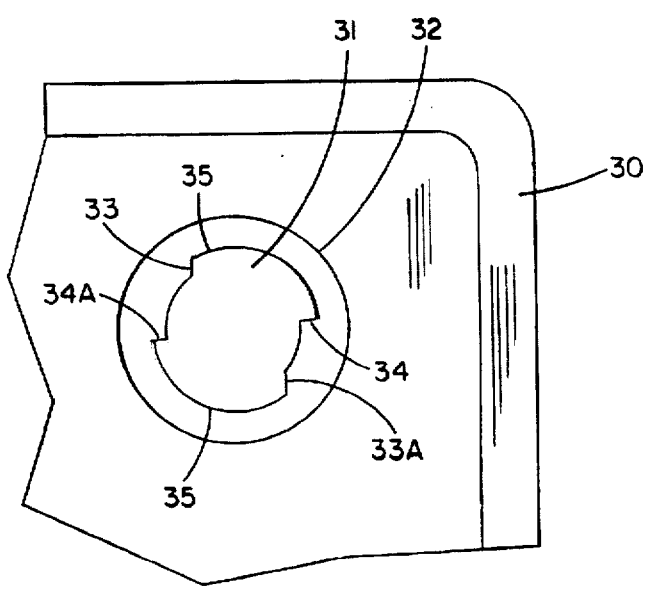
FIG. 8: is a top view of the lay-out in the direction of the arrow VIII.

FIGS. 7 and 8 illustrate that a fastening element (30) can be mounted with the invention related device; whereby, the fastening element (30) forms stop boundaries for the twisting of the spreader screw.

The dowel component (15) is, hereby, set in a bore hole (29) in the cabinet/furniture component (28). The spreader screw (1) engages through an opening (31) of the fastening element (30), so that when the spreader screw is twisted, this fastening element is pulled downward on the dowel component (15) and fixed.

When the spreader screw (1) is twisted, the wedge areas (13), which form the shoulder (14) of the spreader screw, simultaneously reach in the area of the notch (19) and fit there. This prevents the spreader screw from pulling out of the dowel component in the "spread out" position.

Furthermore, it is provided that in the open position, the dog point projections (4, 5) of the spreader screw lay on a corresponding shoulder (33, 33a) which are on an arranged opening (31) on the fastening element. When the spreader screw (1) is twisted clockwise, the dog point projections (4, 5) move in the area of the radius shaped opening (35) until they hit the shoulders (34, 34a), by means of which the closed or spread position of the spreader screw (1) is defined.

In other respects, the center opening (31) can be designed as a countersunk bore hole (32) in order to "take up" a correspondingly formed head of the spreader screw (1). It is self-evident that this is not essential to the solution; cylindrical heads of spreader screws can also work together with a corresponding fastening element (30) with a different shape; whereby, then the countersunk bore hole (32) is omitted.

All together, a better spreading action is achieved together for a tightening of the fastening elements.

What is claimed is:

1. A spreader dowel comprising a one-piece dowel component and a noncircular spreader screw wherein the dowel component has an inner notch formed to fit the outer contour of the spreader screw, and the spreader screw has at least one thread convolution formed as a spreader cam radially projecting on opposite sides of the spreader screw defining a somewhat oval-shaped cross-section, and wherein said inner notch of the dowel component has a cross-section defined by opposing mirror symmetrical arcuate ends and opposing sides including straight portions diametrically opposite one another and slanted inwardly pointing straights.

\* \* \* \* \*